Patented Sept. 24, 1935

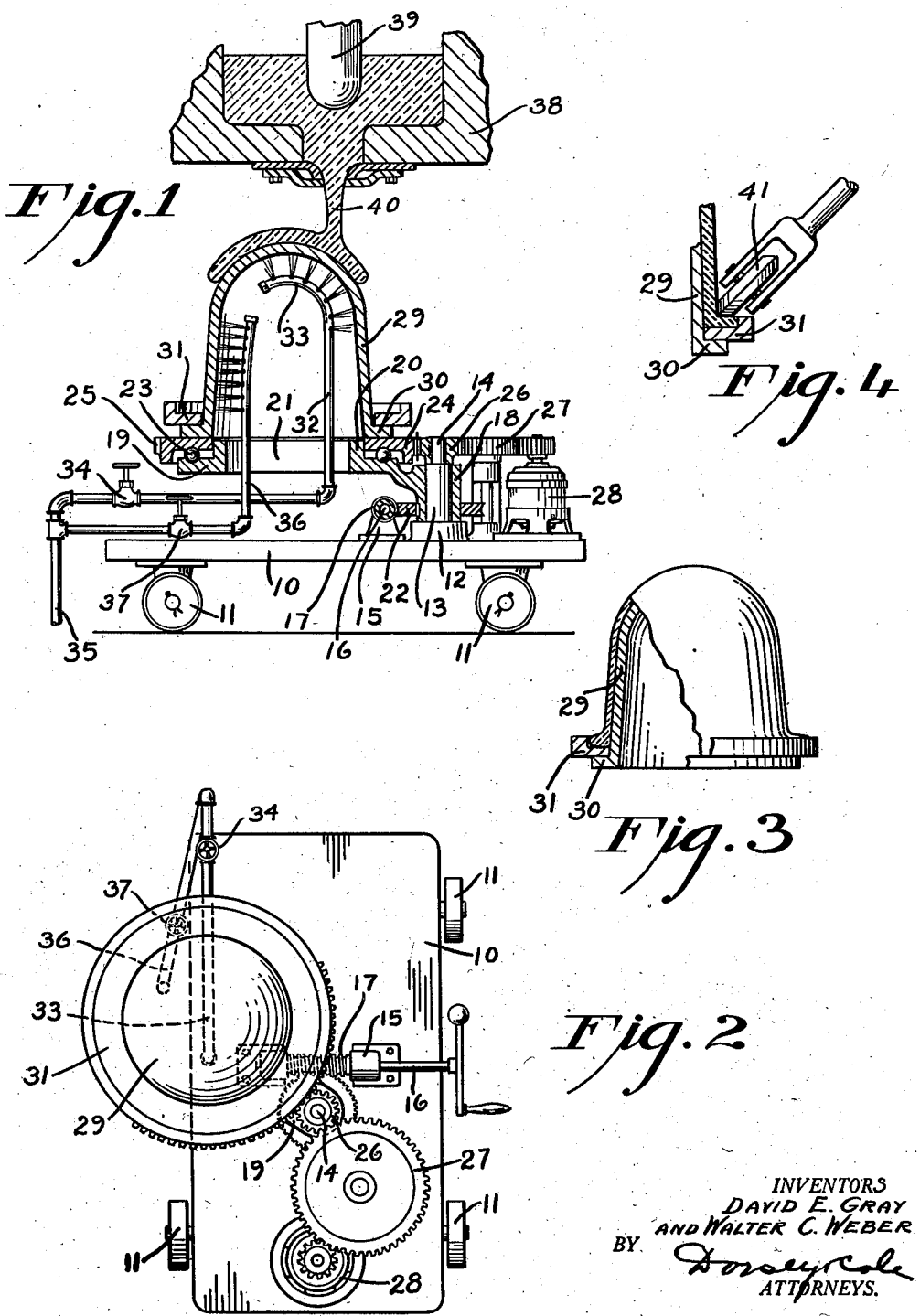

2,015,219

UNITED STATES PATENT OFFICE 2,015,219

METHOD OF FORMING GLASSWARE

David E. Gray, Corning, and Walter C. Weber, Coopers Plains, N. Y., assignors to Corning Glass Works, Corning, N. Y., a corporation of New York Application May 31, 1934, Serial No. 728,446

3 Claims. (Cl. 49—39)

This invention relates to forming glassware and more particularly to the casting of large vessels.

The forming of large glass vessels, especially those of considerable depth, by ordinary pressing methods is not practicable owing to the difficulty of obtaining uniform distribution of the glass between the walls of the press mold and the plunger and particularly when working with the harder glasses, i. e., borosilicates of the type disclosed in Sullivan and Taylor Patent 1,304,623. It is impossible to cause such glasses to flow upwardly around a deep plunger due to their high viscosity at relatively low temperatures.

The object of the present invention is to facilitate the formation of large vessels of glass.

Another object is to produce a vessel which has smooth outer and inner surfaces and is free from laps and like imperfections.

The above and other objects may be attained by employing our invention which embodies among its features flowing a mass of glass directly from the outlet orifice of a forehearth over the exterior of a rotatable forming member which moves transversely of the direction of the flow of the glass stream issuing from the outlet orifice permitting the glass to flow downwardly over the forming member, rotating the latter about its vertical axis to distribute glass over its entire surface and cooling the former in selected areas to obtain the desired glass distribution in the wall of the vessel.

In carrying our invention into practice we employ a carriage upon which is pivotally mounted a table carrying a forming member which is rotated through the medium of a suitable prime mover such as an electric motor, means being provided for swinging the table around its pivot during rotation of the forming member. We also provide means for limiting the downward flow of the glass, shaping its edge into any suitable form such as an outstanding flange, and cooling the former in selected areas as the glass flows over it.

In the drawing:

Fig 1 is a side view partly in section of a forming device constructed in accordance with this invention showing the same in position beneath a forehearth showing the manner in which a stream of glass flows over the former;

Fig. 2 is a plan view of the forming device;

Fig. 3 is a side view partly in section showing the former with the glass in position on it; and Fig. 4 is a fragmentary detail view of the former and glass, showing the apparatus employed for shaping the flange on the glass vessel.

Referring to the drawing in detail a carriage 10 mounted on casters 11 is provided near one end with an upwardly extending boss 12 which is surmounted by a trunnion 13 at the upper end of which is a cylindrical extension 14. Extending upwardly from the upper surface of the carriage 10 in spaced relation are ears 15 having aligning openings for the reception of a shaft 16 and carried by the shaft between the ears 15 is a worm 17 for a purpose to be more fully hereinafter described.

Mounted for rotation on the trunnion 13 is a collar 18 carrying a table 19 which is provided with a collar 20 surrounding an opening 21. A worm gear 22 is fixed to the collar 18 intermediate its ends and meshes with the worm 17 so that upon rotation of the shaft 16 the table 19 will swing about the axis of the trunnion 13. Formed in the upper surface of the table 19 concentric with the collar 20 is a ball race in which are bearing balls 23 upon which a former carrying ring 24 is rotatably mounted. This ring 24 is provided with peripheral teeth 25 for meshing engagement with the teeth on a pinion 26 which is mounted for rotation on the cylindrical extension 14 of the trunnion 13. This pinion in turn meshes with a suitable gear train 27 which is driven by a suitable prime mover 28 such as an electric motor which is mounted on the carriage 10.

Attached to the upper face of the former carrying ring 24 is a hollow former 29 which in the present instance consists of a dome shaped body having an outwardly extending flange 30 which supports a glass forming ring 31. Extending upwardly into the interior of the former through the opening 21 in the table 19 is a pipe 32 the upper end of which is bent as at 33 to conform to the shape of the former and is perforated in such a manner that fluid within the pipe will issue as a series of jets which play upon the interior of the former as illustrated. The end of the pipe opposite its bent end 33 is connected through a suitable valve 34 with a fluid pressure supply line 35. Extending into the former in substantially parallel relation to the pipe 32 is a pipe 36 which like the pipe 32 is connected through a valve 37 to the fluid pressure supply line 35 and this pipe 36 is provided near its upper end with a series of perforations which direct jets of fluid against the interior of the former 29 below the zone affected by those issuing from the pipe 32.

In use the carriage 10 is moved into position under the outlet orifice of a forehearth 38 which is normally closed by a plug 39. After the carriage has been placed in position, the plug 39 is elevated thus permitting a stream of glass 40 to issue from the forehearth and flow over the former 29 as shown in Fig. 1. In order to control the distribution of the glass over the former, the shaft 16 is rotated to cause the table to move transversely of the direction of motion of the stream 40 and at the same time the former is rotated on the bearing balls 23 through the medium of the ring 24, pinion 26, gear train 27 and prime mover 28. After a sufficient amount of glass is deposited on the former the plug is lowered to close the orifice and the stream 40 is cut off by any suitable cutting device (not shown). The glass on the former sags down over its sides until its lower edge engages the ring 31 where it is shaped into a flange as shown. In order to ensure proper glass distribution on the former, the valves 34 and 37 are manipulated to control the flow of fluid through the pipes 32 and 36 and thereby control the rapidity with which heat is conducted away from the upper and lower zones of the former. By thus controlling the cooling of the former, the rapidity with which the glass is set can be readily governed and hence its thickness or distribution in different zones can be regulated.

After the article has thus been formed, it may be finished by applying a roller 41 as shown in Fig. 4 to smooth off the joint between the main body of glass and the outstanding flange which is formed by the ring 31.

While in the foregoing there has been shown and described the preferred embodiment of our invention, it is to be understood that minor changes in the details of construction, combination, and arrangement of parts may be resorted to without departing from the spirit and scope of our invention as claimed.

What is claimed is:

1. The method of forming glassware which includes flowing molten glass downwardly over a former, rotating the former about its vertical axis to cause symmetry of distribution of the glass on the former and cooling the former in selected areas to control the thickness of the glass.

2. The method of forming glassware which includes flowing molten glass downwardly over a former, rotating the former about its vertical axis and moving the former transversely of the direction of flow of the glass to cause symmetry of distribution of the glass on the former.

3. The method of forming glassware which includes flowing molten glass downwardly over a former, rotating the former about its vertical axis, moving the former transversely of the direction of flow of the glass to cause symmetry of distribution of the glass on the former and cooling the former in selected areas to control the thickness of the glass.

DAVID E. GRAY.
WALTER C. WEBER.